(12) United States Patent
Vangala et al.

(10) Patent No.: US 11,461,339 B2
(45) Date of Patent: Oct. 4, 2022

(54) EXTRACTING AND SURFACING CONTEXTUALLY RELEVANT TOPIC DESCRIPTIONS

(71) Applicant: MICROSOFT TECHNOLOGY LICENSING, LLC, Redmond, WA (US)

(72) Inventors: Vipindeep Vangala, Hyderabad (IN); Ranganath Kondapally, Hyderabad (IN); Beethika Tripathi, Hyderabad (IN); Madan Gopal Jhanwar, Hyderabad (IN); Jimish Bhayani, Hyderabad (IN); Daraksha Parveen, Hyderabad (IN); Priyam Bakliwal, Hyderabad (IN); Pankaj Vasant Khanzode, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 68 days.

(21) Appl. No.: 17/163,421

(22) Filed: Jan. 30, 2021

(65) Prior Publication Data

US 2022/0245159 A1  Aug. 4, 2022

(51) Int. Cl.
*G06F 16/2457* (2019.01)
*G06N 20/00* (2019.01)

(52) U.S. Cl.
CPC .. *G06F 16/24575* (2019.01); *G06F 16/24578* (2019.01); *G06N 20/00* (2019.01)

(58) Field of Classification Search
CPC ........ G06F 16/24575; G06F 16/24578; G06N 20/00
See application file for complete search history.

(56) References Cited

U.S. PATENT DOCUMENTS

| 7,346,494 B2 | 3/2008 | Ando et al. |
| 8,990,097 B2 * | 3/2015 | Spivack ................. H04L 51/52 705/1.1 |

(Continued)

OTHER PUBLICATIONS

Devlin, et al., "BERT: Pre-training of Deep Bidirectional Transformers for Language Understanding", In Repository of arXiv:1810.04805v1, Oct. 11, 2018, 14 Pages.

(Continued)

*Primary Examiner* — Jorge A Casanova
(74) *Attorney, Agent, or Firm* — Newport IP, LLC; Jacob P. Rohwer

(57) ABSTRACT

Techniques for extracting and ranking multiple topic descriptions based on source contexts and subsequently selecting individual topic descriptions to surface based on recipient contexts. More specifically, a mining platform may extract, from a set of source documents making up a corpus, topic descriptions for various topics that are relevant to an enterprise. The mining platform may further rank the extracted topic descriptions based on a source context of those documents from which individual topic descriptions are extracted. Subsequently, when users access enterprise (Continued)

documents including term-usage instances of topics for which one or more topic descriptions have been extracted and ranked, a description serving module may select a topic description that is contextually appropriate for a recipient view the enterprise documents.

20 Claims, 7 Drawing Sheets

(56) References Cited

U.S. PATENT DOCUMENTS

| | | | | |
|---|---|---|---|---|
| 9,632,654 | B1* | 4/2017 | Elassaad | G06N 5/022 |
| 10,235,681 | B2 | 3/2019 | Chang et al. | |
| 10,437,870 | B2 | 10/2019 | Franceschini et al. | |
| 10,592,605 | B2 | 3/2020 | Ajmera et al. | |
| 10,824,628 | B2 | 11/2020 | Shi et al. | |
| 11,138,519 | B1* | 10/2021 | Giri | G06N 20/00 |
| 2004/0230572 | A1* | 11/2004 | Omoigui | G06F 16/36 |
| 2010/0280985 | A1* | 11/2010 | Duchon | G06N 7/005 |
| | | | | 706/54 |
| 2012/0246098 | A1* | 9/2012 | Chari | G06N 20/00 |
| | | | | 706/12 |
| 2013/0204876 | A1* | 8/2013 | Szucs | G06F 16/313 |
| | | | | 707/738 |
| 2016/0232157 | A1* | 8/2016 | Mansour | G06K 9/00 |
| 2019/0005138 | A1* | 1/2019 | Andreica | G06F 16/9535 |
| 2020/0374146 | A1* | 11/2020 | Chhabra | H04L 12/1822 |
| 2021/0012237 | A1* | 1/2021 | Perera | G06F 40/30 |
| 2021/0117617 | A1* | 4/2021 | Blaya | G06F 40/253 |
| 2021/0256084 | A1* | 8/2021 | Marsh | G06Q 40/06 |
| 2021/0287130 | A1* | 9/2021 | Kalluri | G06N 20/00 |
| 2021/0342709 | A1* | 11/2021 | Klug | G06N 20/20 |
| 2021/0382893 | A1* | 12/2021 | Kumar | G06Q 10/06311 |

OTHER PUBLICATIONS

Hu, et al., "Mining and Summarizing Customer Reviews", In Proceedings of the Tenth ACM SIGKDD International Conference on Knowledge Discovery and Data Mining, Aug. 22, 2004, pp. 168-177.

Lan, et al., "Albert: A Lite Bert for Self-Supervised Learning of Language Representations", In Repository of arXiv:1909.11942v1, Sep. 26, 2019, 16 Pages.

Sanh, et al., "DistilBERT, a Distilled Version of BERT: smaller, faster, cheaper and lighter", In Repository of arXiv:1910.01108v1, Oct. 2, 2019, 5 Pages.

Singh, et al., "DSC IIIT-ISM at SemEval-2020 Task 6: Boosting BERT with Privileged and Confidential 12 SK/SG Dependencies for Definition Extraction", In Repository of arXiv:2009.08180v1, Sep. 17, 2020, 7 Pages.

Spala, et al., "DEFT: A Corpus for Definition Extraction in Free-and Semi-Structured Text", In Proceedings of the 13th Linguistic Annotation Workshop, Aug. 1, 2019, pp. 124-131.

Spala, et al., "SemEval-2020 Task 6: Definition Extraction from free text with the DEFT Corpus", In Repository of arXiv:2008.13694v1, Aug. 31, 2020, 9 Pages.

Tang, et al., "Distilling Task-Specific Knowledge from BERT into Simple Neural Networks", In Repository of arXiv:1903.12136v1, Mar. 28, 2019, 8 Pages.

* cited by examiner

EXTRACTING AND SURFACING CONTEXTUALLY RELEVANT TOPIC DESCRIPTIONS

BACKGROUND

Disseminating enterprise knowledge that is both accurately curated and appropriately scoped with respect to individual recipients is a challenging process faced by modern enterprises. A typical process for disseminating enterprise knowledge typically includes manually curating content associated with relevant topics and then explicitly sharing the curated content by way of various enterprise computing resources. For example, manually curated content may be widely disseminated with a predefined group of users by way of shared computing resources such as SharePoint sites. As another example, manually curated content may be disseminated directly to individual users by way of user-specific communications such as emails or chat messages.

Unfortunately, manual curation and sharing of content associated with relevant topics often results in inefficient and inappropriately scoped dissemination of enterprise knowledge. For example, an employee's email account may include email communications having various descriptive materials associated with a newly developing topic such as a project that is in an early incubation stage. In the event that the employee moves on to a different role or leaves the organization these descriptive materials may become trapped within the email account. Furthermore, the descriptive materials may include multiple descriptions of the topic that have been specifically scoped for different purposes and/or audiences. Thus, even if these descriptive materials do not become trapped within the email account, a recipient may be provided with otherwise gain access to various descriptions of the topic that are inappropriately scoped for their particular need-to-know basis regarding the topic.

It is with respect to these and other considerations that the disclosure made herein is presented.

SUMMARY

Technologies described herein facilitate extracting, from a corpus that is generated from enterprise computing resources, topic descriptions for enterprise relevant topics and then selecting individual topic descriptions that are contextually appropriate for individual recipients. Generally described, embodiments disclosed herein input the corpus into machine learning (ML) models that are configured to extract the topic descriptions of various categories and to generate a ranked listing of the topic descriptions based on corresponding source contexts. For example, a topic description extracted from a document that is authored by a person recognized to be an expert in the relevant topic may be ranked higher than other topic descriptions extracted from documents authored by non-experts with respect to the relevant topic. In generating the ranked listing, the system may potentially identify multiple descriptions of a particular topic that may be appropriate under differing contextual circumstances. Then, as a recipient accesses an individual document that references the particular topic, a description serving module selects for exposure a particular topic description that is appropriate based on a recipient context of the recipient regarding the particular topic. For example, a high-level description may be selected from the ranked listing if the recipient is an accountant viewing a budgeting document that references the particular topic whereas a relatively more detailed description may be selected if the recipient is an engineer viewing a technical engineering document that references the particular topic. In some embodiments, the description serving module may select a particular topic description that is appropriate for the recipient based on an access control list (ACL) granting and/or restricting the recipient with access to source documents from which the various topic descriptions have been extracted. In this way, the techniques described herein efficiently disseminate enterprise knowledge in a manner that is both contextually appropriate for recipients and which strictly complies with enterprise defined access restrictions and permissions.

In an exemplary embodiment, a mining platform receives a corpus that is extracted from enterprise computing resources that store documents in association with multiple different user accounts. Enterprise computing resources may include data sources that uniquely corresponds to individual user accounts such as, for example, email data or personal cloud storage data. Additionally, or alternatively, the enterprise computing resources may include data sources that are accessible by way of two or more different user accounts such as, for example, web-based collaboration platforms (e.g., Microsoft® SharePoint®) that are accessible and/or editable by multiple users. In some embodiments, the corpus is generated in a manner that specifically omits documents that satisfy corpus exclusion criteria. For example, the corpus may omit individual documents having corresponding metadata indicating that the individual documents are confidential and/or proprietary notwithstanding such documents being stored in data sources designated for description mining.

The mining platform may then input the corpus into one or more ML models that identify topics that are relevant to the enterprise and further extract and rank topic descriptions corresponding to these identified topics. An exemplary such ML model may be a natural language processing (NLP) model that is configured to identify a category of individual sentences and/or groups of sentences within the set of documents that make up the corpus. Exemplary categories include, but are not limited to, authoritative definitions for identified topics, information associated with identified topics, and opinions regarding identified topics. In some implementations, multiple different types of ML models may be deployed to extract different types of descriptions from the corpus. For example, a first ML model may be deployed to extract single line definitions from the corpus, a second ML model may be deployed to extract multiple line definitions from the corpus, and a third ML model may be deployed to generate summarizations corresponding to identified topics.

The ML model(s) may generate a ranked listing of the extracted topic descriptions based on one or more source contexts associated with individual ones of the topic descriptions. Source contexts may include, but are not limited to, authoritative statuses of persons who authored one or more topic descriptions, dissemination levels of individual topic descriptions across user accounts and/or the enterprise computing resources, attributes of source documents from which the topic descriptions are extracted, and so on. For example, an individual topic description may be placed/ranked within the ranked listing based on an authoritative status of an author of the individual description within the enterprise (e.g., a particular description having been authored by a CEO may weigh in favor of a higher ranking). Additionally, or alternatively, an individual topic description may be placed/ranked within the ranked listing based on an authoritative status of an author of the individual description with respect to an individual topic (e.g., a particular description having been authored by a recognized expert in the topic and/or a Project Manager overseeing a project related to the topic may weigh in favor of a higher ranking).

In some embodiments, a description serving module may receive an output from the ML model(s) and subsequently utilize the output to surface individual topic descriptions to recipients that access documents referencing corresponding topics. For example, an individual user (in this instance the recipient) may open an email or other document including a reference to a particular topic for which the ML models have extracted one or more topic descriptions. Here, the description serving module may select a topic description and surface the same by linking the reference to the topic in the document to a topic card that includes the selected topic description. Under circumstances in which multiple topic descriptions have been extracted for a particular topic, the description serving module may select a particular topic description to surface based on a recipient context. For example, the description serving module may select a topic description to surface based on a department attribute of the recipient (e.g., an engineer may receive more detailed or technical descriptions of engineering topics than employees in other departments).

In some embodiments, the description serving module may surface a highest ranking topic description to which an individual recipient has access. For example, the ranked listing may include for a single topic both of a first topic description extracted from a first source document and a second topic description extracted from a second source document. Here, suppose that the first topic description is ranked higher within the ranked listing than the second topic description. Further suppose that an access control list (ACL) grants a recipient with access to the second source document but not the first source document. Under these circumstances, the description serving module may the second topic description to the recipient based on the ACL permissions and/or restrictions.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for extracting and ranking multiple topic descriptions based on source contexts and subsequently selecting individual topic descriptions to surface based on recipient contexts. More specifically, a mining platform may extract, from a set of source documents making up a corpus, topic descriptions for various topics that are relevant to an enterprise. The mining platform may further rank the extracted topic descriptions based on a source context of those documents from which individual topic descriptions are extracted. Subsequently, when users access enterprise documents including term-usage instances of topics for which one or more topic descriptions have been extracted and ranked, a description serving module may select a topic description that is contextually appropriate for a recipient view the enterprise documents.

Implementations of the techniques described herein extract enterprise knowledge from various enterprise computing resources in a manner that significantly reduces manual curation efforts. Specifically, rather than relying on technical experts to manually generate descriptive materials to document rapidly evolving bodies of enterprise documentation, the techniques described herein continuously or periodically mine an evolving corpus of the enterprise documentation to extract topic descriptions of a variety of categories. Implementations may then select previously extracted topic descriptions to surface to recipients based on their specific recipient context such as, for example, the type of document the topic description is being surfaced through, the technical expertise or assigned responsibilities of the recipient, and/or whether an access control list (ACL) permits the recipient to access the underlying source documents from which certain topic descriptions have been extracted. In this way, relevant enterprise knowledge is extracted via various ML models and then presented in a manner that is both contextually appropriate for recipients and which strictly complies with enterprise defined access restrictions and permissions. Furthermore, the relevant corpus from which topic descriptions are ultimately mined may be generated to specifically omit documents that are confidential, proprietary, or otherwise meet certain predefined corpus exclusion criteria. It should be appreciated therefore that the techniques described herein significantly improve computing security over conventional knowledge mining techniques which extract and serve topic descriptions. For example, rather than indiscriminately mining from an entire body of enterprise documentation, implementations described herein selectively exclude documentation from the corpus based on corpus exclusion criteria and also selectively serve extracted content to recipients based on their specific context for viewing a document and/or whether the recipient has access to an underlying source of the extracted content.

Figure 1:
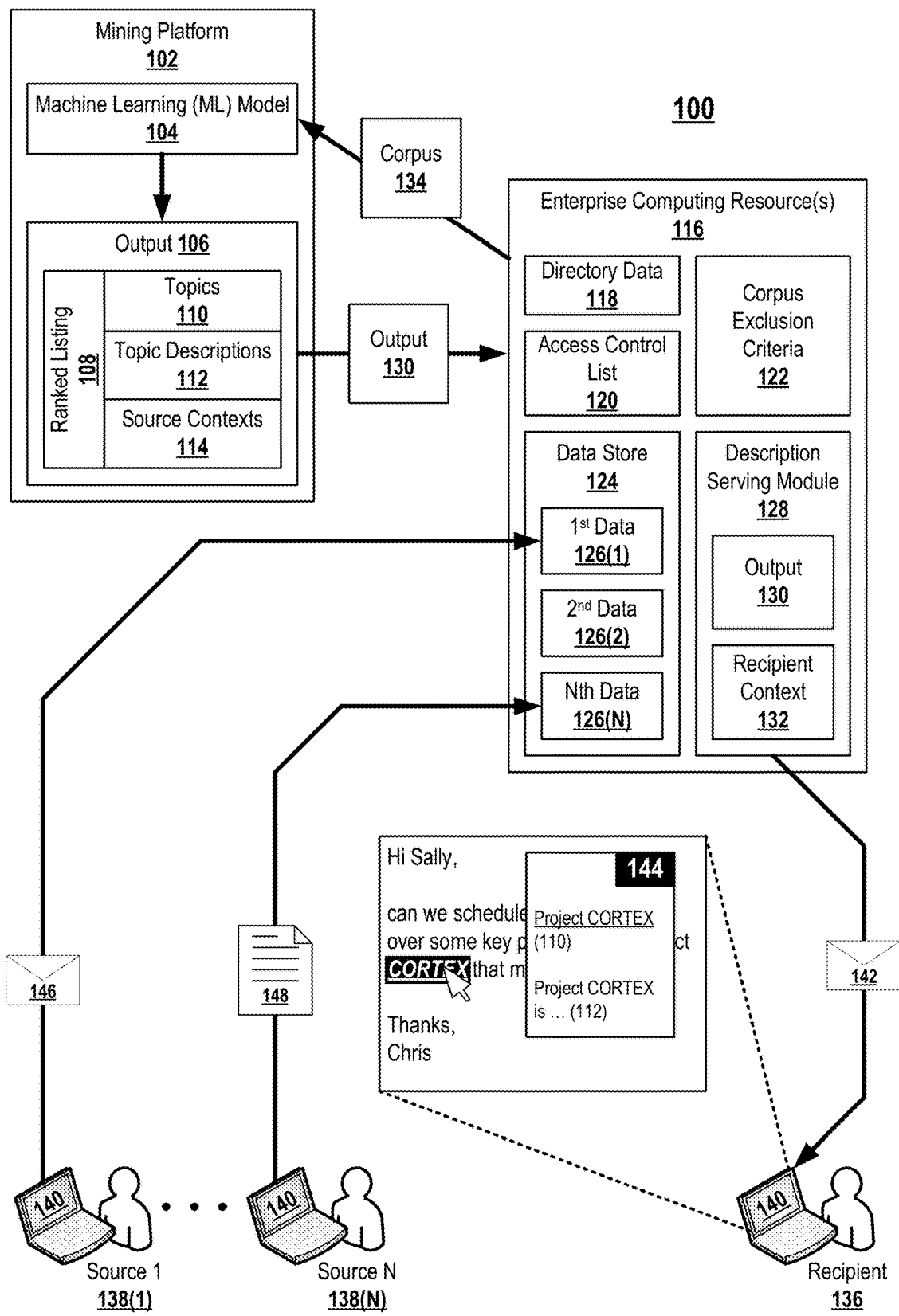
FIG. 1 illustrates an exemplary computing environment in which multiple topic descriptions are extracted and ranked based on source contexts and selected to subsequent surfacing to a recipient based on a corresponding recipient context.

Turning now to FIG. 1, illustrated is an exemplary computing environment 100 in which multiple topic descriptions 112 are extracted and ranked based on source contexts 114 and selected to subsequent surfacing to a recipient 136 based on a corresponding recipient context 132. As illustrated, the computing environment 100 includes a mining platform 102 that is in communication with one or more enterprise computing resources 116. The enterprise computing resources 116 may include various enterprise data sources which may be publicly available to non-enterprise persons (e.g., public websites generated and/or hosted by an enterprise), selectively available to groups of predefined users within an enterprise (e.g., web-based collaboration platforms shared by groups of users within a specific department), and/or user-specific (e.g., an email and/or online data storage that uniquely corresponds to an individual user account). Accordingly, the enterprise computing resources 116 may include email account data that includes individual electronic message stored in association with individual users' email accounts (e.g., Microsoft® Outlook® accounts), business communication platform data that includes messages and/or documents that are accessible via multiple user accounts (e.g., Microsoft® Teams® accounts, Microsoft® Yammer® accounts), public facing internet data that includes webpages or downloadable resources that are accessible to non-enterprise persons, as well as external data such as media Wikis and ServiceNow. The various enterprise data sources may be collectively stored in a data store 124 which may be hosted by an enterprise and/or by a third-party providing computing services to the emprise as a tenant (e.g., Microsoft® Office365® tenant services).

As illustrated, the mining platform 102 receives a corpus 134 that is extracted from the enterprise computing resources 116. Generally described, the corpus 134 is comprised of various digital documents or other electronic data that is stored in association with one or more user accounts 126. In some embodiments, the corpus 134 may be a tenant-specific corpus in the sense that is at least partially comprised of enterprise data sources that are accessible by way of enterprise issued credentials such as username-password combinations that uniquely correspond to individual user accounts 126. For example, the corpus 134 may include email messages that uniquely correspond to various individual enterprise user accounts and/or web-based collaboration platform data that is accessible and/or editable by multiple user accounts. Thus, the corpus 134 may include pieces of information that are gathered from a multitude of varying data sources that are typically maintained or otherwise provided to employees by a modern enterprise. For example, the corpus 134 may include enterprise data that is specific to an individual enterprise tenant that is facilitated by a third-party productivity platform vendor (Microsoft® Office 365®) and/or enterprise data that is hosted by enterprise owned and operated computing resources.

In some embodiments, the corpus 134 is generated based on corpus exclusion criteria 122 that defines attributes for selectively excluding a subset of enterprise data from the corpus 134. For example, within a modern enterprise's vast data store(s) 124 may be various documents or data files that include sensitive information which the enterprise may deem unsuited for mining. To illustrate this point, suppose that an enterprise has documents related to currently pending or previously pursued mergers and/or acquisitions with other enterprises. As such documents have a high probability of including sensitive data related to proprietary subject matter such as trade secrets which are unsuitable for data extraction, the enterprise may maintain metadata that designates these documents as confidential. The corpus exclusion criteria 122 may inform the mining platform 102 and/or enterprise computing resources 116 of certain attributes or characteristics of data which warrant exclusion from the corpus 134 (e.g., to prevent the mining of and subsequent unauthorized disclosure of sensitive information). In an exemplary embodiment, the corpus exclusion criteria 122 may define one or more metadata attributes that prevent individual documents from being compiled into the corpus 134. Additionally, or alternatively, the corpus exclusion criteria 122 may define document characteristics that prevent individual documents from being compiled into the corpus 134. Exemplary document characteristics may include, for example, an inclusion of sensitive personal information such as medical and/or financial data.

Upon receiving the corpus 134, the mining platform 102 deploys one or more machine learning (ML) models 104 that are configured to identify topics from within the corpus 134. For example, the ML models 104 may identify acronyms that are referenced within individual documents of the corpus 134, project names referenced and described in enterprise documentation, and various other notable topics that are relevant to the enterprise from which the corpus 134 is obtained. Additionally, or alternatively, the ML models 104 may extract topic descriptions corresponding to these identified topics. An exemplary such ML model 104 may be a natural language processing (NLP) model that is configured to identify a category of individual sentences and/or groups of sentences within the set of documents that make up the corpus. Exemplary categories include, but are not limited to, authoritative definitions for identified topics, information associated with identified topics, and opinions regarding identified topics.

In some embodiments, the ML models 104 may include a Bidirectional Encoder Representations from Transformers (BERT) model that is configured to perform transformer-based ML techniques to extract different types of topics descriptions including, but not limited to, single line definitions, multiline definitions, and topic summarizations compiled from single or multiple discrete data sources. For example, a BERT model may be deployed to identify candidate topic descriptions from the corpus 134 and then to rank the candidate topic descriptions based on enterprise specific signals indicating a level of importance of individual candidate topic descriptions with respect to a particular enterprise. Exemplary such enterprise signals include, but are not limited to, a seniority level of one or more authors of individual topic descriptions, indications of whether author(s) of individual topic descriptions have assigned workloads that correspond or relate to the corresponding topics, and levels of dissemination of individual topic descriptions across an enterprise. In some implementations, these enterprise specific signals are generated by way of supervised learning techniques. By utilizing the enterprise specific signals, the ML model(s) 104 are enabled to identify topic descriptions that are uniquely relevant to a specific enterprise and to further rank these identified topic descriptions at an organizational level (i.e., in a manner that is uniquely appropriate to an individual enterprise).

As illustrated, the ML model(s) 104 generate an output 106 that includes a ranked listing 108 that defines topics 110 and a prioritized order of one or more topic descriptions 112 corresponding to individual ones of the topics 110. For example, the ranked listing 108 may include two discrete (but potentially overlapping) topic descriptions 112 corresponding to a single identified topic 110. Here, the ranked listing 108 may indicate a priority of these two discrete topic descriptions 112 that may be later utilized to select which of these two discrete topic descriptions 112 to surface to a recipient.

In some implementations, the topic descriptions 112 may be ranked in accordance with one or more source contexts 114. Generally described, a source context 114 refers to contextual signals of one or more source documents from which a particular topic description 112 is extracted. For example, a source context 114 may be an indication that a specific document from which a topic description 112 has been extracted was authored by a high-ranking official within an organizational hierarchy of the enterprise. Under these circumstances, this particular source context 114 may result in the topic description 112 being ranked higher (e.g., prioritized for exposure) over one or more other topic descriptions that correspond to the same identified topic but are authored by lower ranked personnel. As another example, a source context 114 may be an indication that a specific document from which a topic description 112 has been extracted was authored by a member of an accounting department. Under these circumstances, this particular source context 114 may result in the topic description 112 being prioritized for exposure when a recipient context 132 indicates that a recipient is also a member of the accounting department. In this way, topic descriptions 112 may be selected for exposure based on a correspondence between source context 114 and recipient context 132. For example, an indication that an author of a particular topic description 112 has a similar relationship with respect to a topic as a recipient may weigh in favor of surfacing the particular topic description over other topic descriptions which relate to the same topic but which have been authored by persons with dissimilar relationships to the topic. To illustrate this point, it can be appreciated that accounting personnel may have a markedly different relationship to the specific topic of "patents" as compared to legal personnel.

As illustrated the output 106 generated by the ML model(s) 104 may be provided to a description serving module 128 which may be deployed to actively surface topic descriptions 112 to recipients in accordance with the ranked listing 108. For example, an individual user who accesses a data object 142 including a reference to an identified topic 110 for which one or more topic descriptions 112 exist within the ranked listing 108 may be presented with (or otherwise provided access to) the one or more topic descriptions 112. For purposes of the present disclosure, such a user is referred to as a recipient 136 in the sense that the user receives topic description(s) 112. Exemplary data objects 142 that a recipient can access to trigger exposure to a topic description 112 include web-hosted emails, word processing documents, spreadsheet documents, Intranet websites, Internet websites, persistent messages (Microsoft® Teams' messages), or any other electronic documents. For example, as illustrated, the recipient is shown to utilize a computing device 140 to view an email message that references an identified topic 110 (i.e., "Project CORTEX" or "CORTEX").

The description serving module 128 may analyze content of the data object 142 that is accessed by the recipient 136 to identify term-usage instances that reference topics 110 identified by the ML model(s) 104. For example, as shown in FIG. 1, the description serving module 128 has identified a usage instance of the term "CORTEX" within the email being viewed by the recipient 136. The description serving module 128 may further select a topic description 112, that corresponds to the identified topic 110, from the ranked listing 108. As illustrated, the selected topic description 112 may be surfaced (e.g., exposed or presented) to the recipient 136 by way of the data object 142. As illustrated, the selected topic description 112 is being surfaced by way of a topic card 144 that is superimposed (e.g., composited) over the email message currently being viewed by the recipient. In some implementations, the selected topic description 112 may be exposed (e.g., via the topic card 144) in response to the recipient hovering a curser element over the term usage instance of the relevant topic 110 within a body of the data object 142.

As noted above, in some implementations, the description serving module 128 may select a particular topic description 112 to present to the recipient based on a recipient context 132. As a specific example, suppose that a first topic description is extracted from first data 126(1) that corresponds to a private email 146 that is stored in an email account that does not belong to the recipient 136. In this example, the recipient 136 is restricted from accessing the underlying data source (e.g., the private email 146) from which the first topic description has been extracted. Further suppose that a second topic description is extracted from Nth data 126(N) that corresponds to a document 148 that has been published to a subset of enterprise users that is inclusive of the recipient 136. Thus, although the recipient is restricted from accessing the private email 146 from which the first topic description was extracted, the recipient is permitted to access the document 148 from which the second topic description was extracted. Under these circumstances, the recipient context 132 may correspond to the recipient having access to only one of the two topic descriptions and, therefore, the description serving module 128 may select the second topic description for exposure to the recipient even if the first description is ranked higher within the ranked listing 108.

In some implementations, the description serving module 128 may select a particular topic description 112 to present to the recipient 136 based on a combination of a source context 114 and a recipient context 132. As a specific example, suppose that a first topic description is extracted from first data 126(1) that corresponds to a first document that is published enterprise wide (e.g., all enterprise users are granted access to the document) whereas a second topic description is extracted from Nth data 126(N) that corresponds to an Nth document that is also published enterprise wide. Thus, in this example the recipient 136 does have access to the underlying sources of each of the first topic description and second topic description (which for purposes of this example relate to the same topic "CORTEX"). Further suppose that the first document is a technical engineering document that is authored by a computer scientist to communicate sophisticated implementation details to other computer scientists whereas the second document is a marketing document that is authored by a marketing specialist to communicate high level benefits of the CORTEX technology to potential customers. Here, it can be appreciated that the underlying source contexts 114 of the first and second topic descriptions is drastically different. Accordingly, the description serving module 128 may map the underlying source contexts 114 to the recipient context 132 to select between the two topic descriptions. For example, if the recipient context 132 corresponds to the recipient 136 having the title of "Sr. Computer Scientist" within directory data 118 (e.g., an Azure Active Directory maintained by the enterprise), then the description serving module 128 may select the first topic description for exposure to the "Sr. Computer Scientist" recipient 136. Alternatively, if the recipient context 132 instead corresponds to the recipient 136 having the title of "Marketing Intern" within the directory data 118, then the description serving module 128 may select the second topic description for exposure to the "Marketing Intern" recipient 136.

In some implementations, the recipient context 132 may correspond to a type of content that is included within the data object 142 being accessed by the recipient 136. For example, continuing with the example of the first topic description being extracted from the technical engineering document and the second topic description being extracted from the marketing document, the description serving module 128 may determine which of these two topic descriptions is contextually appropriate based on characteristics of the data object 142 being accessed. To illustrate this point, suppose that the data object 142 corresponds to a Power-Point® presentation titled "Marketing Training for Upcoming Product Releases." Under these specific but non-limiting circumstances, the description serving module 128 may prioritize the second topic description for exposure over the first topic description due to the source context of the second topic description having a higher degree of correspondence to the recipient context 132 than that of the first topic description.

It will be appreciated based on the foregoing that in various implementations the corpus 132 may be a tenant-wide corpus that corresponds to multiple different user accounts that are individually and/or collectively provided with access to various aspects of the enterprise computing resources 116. That is, the corpus 132 may be comprised of documents and/or data objects that are compiled from a multitude of different users' email accounts, online "cloud-based" file storage, internally published documents that are accessible by all enterprise users and/or subsets of users defined by username and/or directory attributes, and so on. In such implementations, topic descriptions 112 may be selectively exposed to individual recipients 136 based on an access control list (ACL). For example, under circumstances in which multiple different topic descriptions 112 have been extracted for a particular topic, then the description serving module 128 may select only from the subset of these multiple different topic descriptions 112 which have been extracted from sources which the ACL permits the recipient 136 access to.

Figure 2:
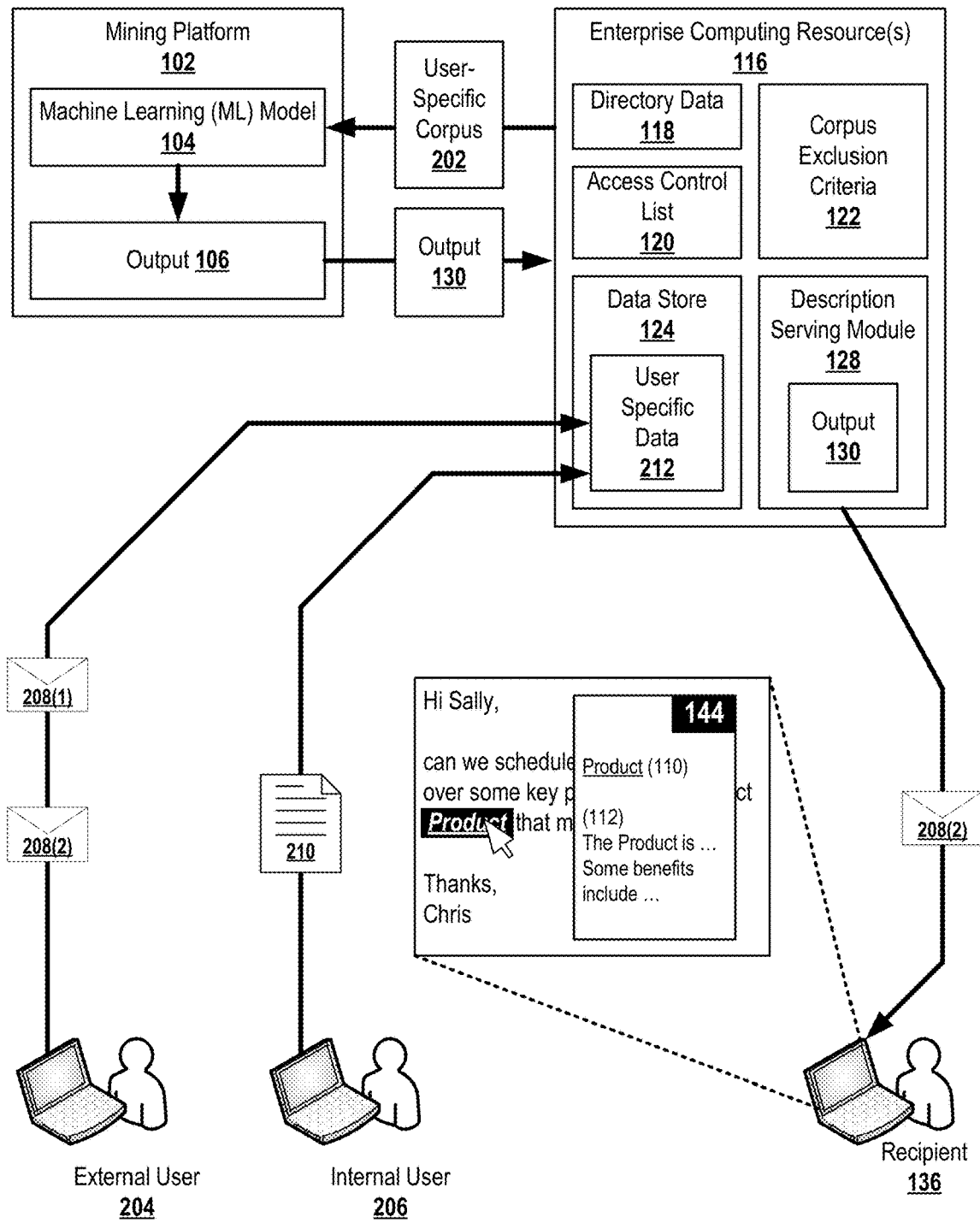
FIG. 2 illustrates an exemplary computing environment in which the mining platform is deployed to extract and rank topic descriptions from a user-specific corpus that uniquely corresponds to the recipient.

Turning now to FIG. 2, illustrated is an exemplary computing environment 200 in which the mining platform 102 is deployed to extract and rank topic descriptions 122 from a user-specific corpus 202 that uniquely corresponds to the recipient 136. The user-specific corpus 202 may be compiled from various documents that are stored in user-specific data 212 within the data store 124. The user-specific data 212 may include emails that have been sent to or by the recipient 136, documents that the recipient 136 has stored in a cloud-based storage account, and so on. In such an implementation, the mining platform 102 may generate an output 106 in a similar manner to that described in relation to other implementations herein. However, the output 106 that is ultimately generated specifically corresponds to the body of information that is stored in relation to a specific user-account. For example, the user-specific corpus 202 may be limited to those individual documents that are stored in the recipient's 136 email account and/or personal cloud-storage account. Additionally, or alternatively, the user-specific corpus 202 may include documents which the recipient 136 is explicitly granted access to by an ACL maintained by the enterprise.

As illustrated, the exemplary computing environment 200 may be suited for extracting information from an ever-evolving body of data available to the recipient 136 and ultimately to surface the extracted information to the recipient 136 in a temporally and/or contextually appropriate manner. For example, as illustrated, an external user 204 (i.e., a user that is not an employee of the enterprise such as a vendor or client of the recipient 136) may send the recipient 136 a first email message 208(1) that includes a reference to a particular topic 110. In some cases, the first email message 208(1) may further include various description materials associated with the particular topic 110. For illustrative purposes, presume that the first email 208(1) is an offer from an external vendor for a "Product" and that the recipient 136 is a purchasing manager within the enterprise. Here, the first email 208(1) may include a product name and corresponding descriptive materials about the product. As further illustrated, an internal user 206 may transmit a document 210 to the recipient 136 that further relates to the product being offered by the external vendor 204. Accordingly, it can be appreciated that since each of the first email 208(1) and the document 210 are stored in the user specific data 212, each of these two data objects may be included within the user-specific corpus 202.

As illustrated, the user-specific corpus 202 is provided as an input to one or more ML models which then generates an output 106. The output 106 includes topic descriptions 112 corresponding to one or more topics 110 that are identified within the user-specific corpus 202. For example, as described above, the ML models 104 may include a BERT model that is configured to perform transformer-based ML techniques to extract different types of topics descriptions including, but not limited to, single line definitions, multi-line definitions, and topic summarizations compiled from single or multiple discrete data sources. For purposes of the present example, presume that the ML models 104 identify the product name as a topic 110 that is relevant to the recipient 136 and further extract one or more topic descriptions 112 corresponding to the topic 110 from the user-specific corpus 202. For example, the ML models 104 may extract descriptive materials associated with the topic 110 that are provided by the external vendor 204 and/or the internal user 206.

As further illustrated, the external user 204 may later send a second email 208(2) that also includes a reference to the identified topic 110. For example, the external user 204 may send a follow-up email to the recipient 136 asking whether she has considered the offer and requesting time to go over various details and/or provide a sales pitch. Here, the description serving module 128 may also identify a reference to the topic 110 (e.g., a term usage instance of the product name) within the second email 208(2) and select an appropriate topic description 112 to surface in association with the second email 208(2). Then, as the recipient 136 accesses the second email 208(2) (e.g., by viewing the email via an email client) the selected topic description 112 may be surfaced to the recipient 136. In some instances, the topic description 112 may include aspects of information that is extracted from multiple different data objects from within the user-specific corpus 202. For example, the topic description 112 may include descriptive materials and/or opinions provided by the external user 204 within the first email 210(2) in addition to other descriptive materials and/or opinions provided by the internal user 206.

In this way, information that has previously been provided to the recipient 136 is resurfaced to the recipient 136 in relation to the documents being accessed (e.g., in this case the second email) in a manner that is both temporally and contextually relevant to the recipients. This specific implementation (and other implementations described herein) represent a marked improvement with respect to improving user interaction with computing resources. For example, rather than the recipient 136 having to manually sift through the vast amounts of his or her user-specific data 212 in an effort to "get up to speed" regarding the topic 110 at the time the second email 208(2) is accessed, the mining platform 102 and the description serving module 128 automatically perform various computations on behalf of the recipient 136 to surface relevant and wanted information regarding topics as reference thereto are identified in documentation accessed by the recipient 136.

Figure 3:
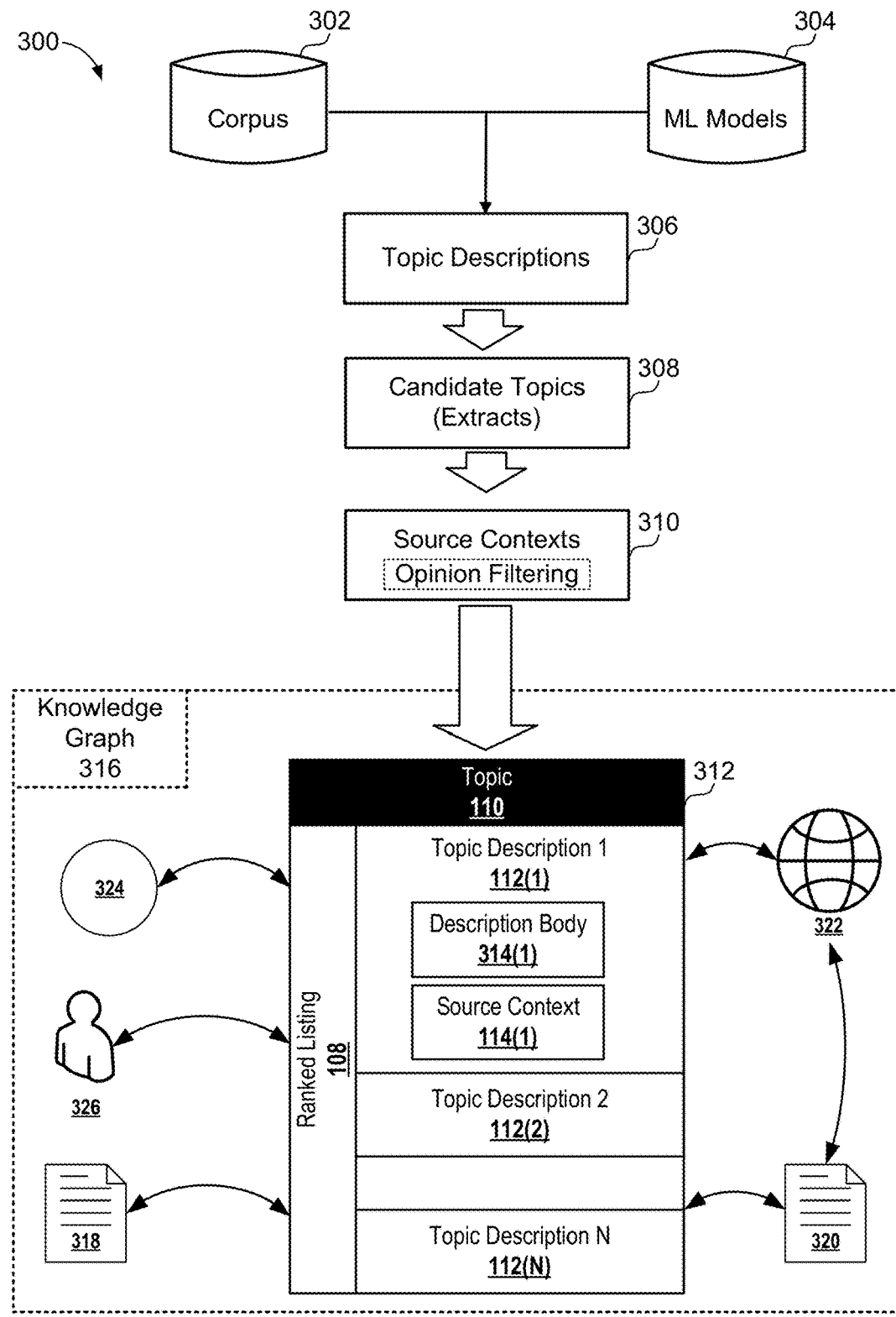
FIG. 3 illustrates an exemplary mining process in which one or more ML models may analyze a corpus based on topic templates to extract and rank topic descriptions.

Turning to FIG. 3, illustrated is an exemplary mining process 300 in which one or more ML models may analyze a corpus 302 based on topic templates to extract and rank topic descriptions 112. In some instances, the extracted and ranked topic descriptions 112 are added to an enterprise knowledge graph 316 that interlinks topics 110 and/or topic descriptions 112 based on source contexts 114 and/or other suitable criteria. The corpus 302 may include vast amount of enterprise-specific, user-specific, and/or public information in the form of unstructured text. In an exemplary implementation, the corpus 302 may be defined in association with compliance boundary parameters to enable topic and topic description mining from information that is distributed across various systems and/or teams within an organization (e.g., enterprise). As described herein, the topic descriptions 112 that are mined may be seamlessly delivered to recipients via the various systems or computing resources that are commonly utilized within an enterprise ecosystem (e.g., productivity suite applications such as those provided via the Microsoft® Office 365® productivity suite applications).

In various implementations, the mining process 300 may be performed for a particular topic type such as a project. Individual topic types may be defined by one or more schema. A project is an example of a topic 110 for which a ranked listing 108 of topic descriptions 112 may be generated via various NLP techniques. Other topic types include, but are not limited to, person names, products, services, or any other topic type suitable for various topic modeling techniques (e.g., cascaded Linear Discriminant Analysis (CLDA) classifier, Nonnegative Matrix Factorization (NMF), and/or transformer-based models such as BERT). In some implementations, individual topic descriptions 112 and/or ranked listings 108 thereof may be included in a knowledge graph 316. In general terms, the mining process 300 may use topic templates identify candidate topic names and generate extracts corresponding to the candidate topic names 306. In some implementations, the topic templates may include text or other formatted data with placeholders to insert formatted values of properties of the individual candidate topics 306. The topic templates may include many templates per topic type. Individual topic templates may be applied to various windows or snippets of text from the corpus 302 that can contain single or multi-word entity type.

The mining process 300 may include operation 306 for extracting topic descriptions from the corpus 302 based on the one or more ML models 304 as described herein. As described below, candidate topics or "terms" may be identified from within these extracted topic descriptions. In some implementations, the ML models 304 deployed at operation 306 may include various NLP understanding models that have been specifically developed for definition mining. In one exemplary embodiment, the ML models 304 include a BERT model that has been specifically configured to perform a definition classification task, and which has been further distilled by training the bidirectional LSTM model using the probability logits obtained from BERT. Exemplary topic descriptions which may be extracted from the corpus 302 based on the ML models 304 may fall into various categories or labels that include, but are not limited to, definition, non-definition, informational, person-definition, and referential. For purposes of the present disclosure, the categories or labels of topic descriptions may be defined as follows:

An extracted topic description may be labeled as a "definition" if it refers clearly to the term and can uniquely define only that term. If it does not already appear as such, the extracted topic description may be rephrased into the form of "X is a Y and no other term Z could be defined using Y." In this sense, an exemplary definition type topic description of the topic "statistics" may be: statistics is a branch of mathematics dealing with data collection, organization, analysis, interpretation and presentation.

An extracted topic description may be labeled as "information" if it provides information or context related to a topic but yet cannot uniquely define the topic. In this sense, an exemplary information type topic description of the topic "statistics" may be: statistics is a branch of mathematics.

An extracted topic description may be labeled as "person-definition" if it provides information related to the name of a person. In this sense, an exemplary person-definition type topic description of the topic (and in this case name) "Peter Clark" may be: Peter Clark is a Senior Associate at CEA with broad experience in technical, political, and legal analysis on air pollution issues.

An extracted topic description may be labeled as "referential" if it is within a definition but contain an explicit term usage instance of the topic but does contain a reference to the topic. In this sense, an exemplary referential type topic description may be: This method is used to identifying a hyperplane which separates a positive class from the negative class.

An extracted topic description may be labeled as "non-definition" if it provides information or context related to a topic but does not fall into any of the aforementioned labels. In this sense, an exemplary non-definition type topic description may be: The Caterpillar 797B is the biggest car I've ever seen.

The mining process 300 may further include operation 306 for identifying candidate topics (e.g., terms) from within the extracted topic descriptions. In some implementations, the operation 306 corresponds to the use of rule-based term extractor that is applied to the topic descriptions extracted at operation 306. Generally described, a rule-based term extractor may be configured to identify terms (e.g., topics) from which the topic descriptions. In some implementations, the rule-based term extractor may be based on a hypothesis that substantially all definition sentences include a finite and identifiable number and/or type of verb phrases. Exemplary such verb phrases may include, but are not necessarily limited to, "is defined as," "means," and "is a." The rule-based term extractor may be further based on a hypothesis that the subject term or topic of such definition sentences occurs in the left side of these verb phrase patterns. For example, the sentence "statistics is a branch of mathematics dealing with data collection, organization, analysis, interpretation and presentation" includes the topic "statistics" on the left side of the verb phrase pattern "is a" which is then followed by a definition type topic description corresponding to the topic.

The mining process 300 may further include operation 310 for determining source contexts associated with the topic descriptions. For example, the operation 310 may include determining an author and/or authors associated with individual topic descriptions. In some implementations, an identified source context may include an authoritative status of a person(s) who authored one or more topic descriptions, dissemination levels of individual topic descriptions across user accounts and/or the enterprise computing resources, attributes of source documents from which the topic descriptions are extracted, and so on.

As illustrated in FIG. 3, in some embodiments the operation 310 may include opinion filtering. It can be appreciated for example that in some cases topic descriptions that are extracted from the corpus 302 may have an element of opinion. As it may be undesirable for opinions contained within individual topic descriptions to impart bias on recipients, in some implementation topic descriptions which are identified as having an element of opinion may be filtered out (e.g., removed/discarded) and/or flagged as being opinion in nature.

The mining process 300 may further include operation 312 at which a ranked listing of the extracted topic descriptions is generated. In the illustrated example, the ranked listing 108 corresponds to a particular topic 110 (e.g., Project CORTEX, Statistics, Peter Clark, etc.) and includes multiple topic descriptions 112 associated with the particular topic 110. Here, each of topic descriptions 112(1) through 112(N) are associated with the particular topic 110 and may each have one or both of a corresponding description body 314 and source context 114. For example, as illustrated, each of the first description body 314(1) and the first source context 114(1) correspond to the first topic description 112(1).

As noted above, in some embodiments, the topic descriptions 112 and/or ranked listing 108 thereof may be added to a knowledge graph 316. As illustrated, the knowledge graph 316 may define various interlinking relationships between the topic 110 and one or more other topics such as, example, documents 318 and 320, websites 322, persons 326, and other entity types 324. Exemplary interlinking relationships may include, for example, related experts, frequently used together, similar, disambiguation, and so on.

Figure 4:
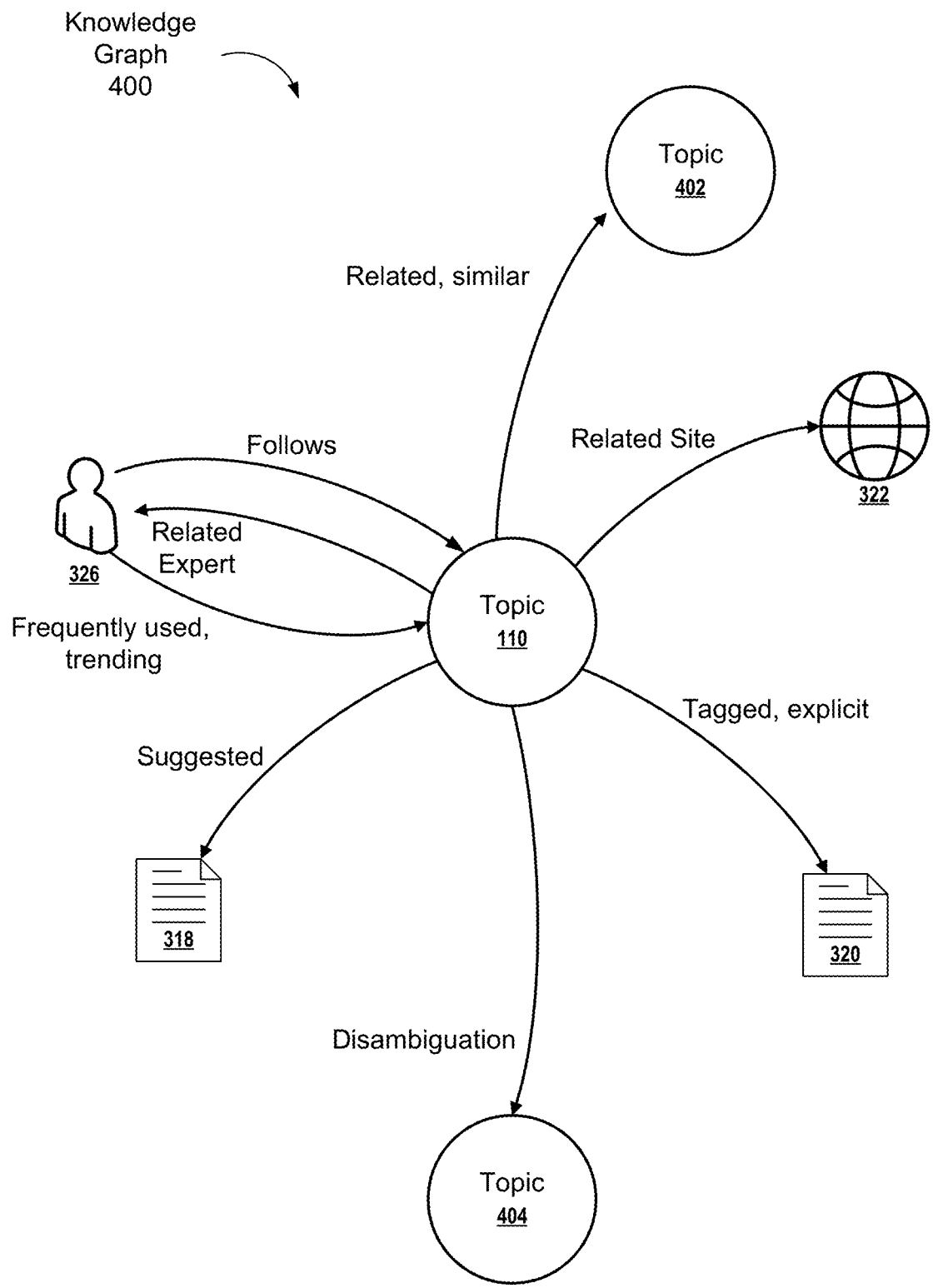
FIG. 4 is an example knowledge graph includes various entities and relationships between the entities.

Referring now to FIG. 4, an example knowledge graph 400 includes entities 318, 320, 322, 326, 402, 404 and relationships between the entities. In an implementation, each entity is represented by an entity record that includes attributes that describe the entity. For example, an attribute can store an attribute value or a link to another entity that is related to the entity. A schema for an entity type defines the attributes of the entity.

As illustrated, the example knowledge graph 400 is a partial knowledge graph including entities related to a topic entity 110. For example, another topic entity 402 is related to the topic entity 110 as a related, similar topic. As another example, a site entity 322 is related to the topic entity 110 as a related site. The site entity 322 may be, for example, a website. As another example, the document entity 320 is related to the topic entity 110 as a tagged, explicit document. For example, the document entity 320 can be tagged by a user curating a topic page for the topic entity 110. As another example, the document entity 318 is related to the topic entity 110 as a suggested document. As another example, the person entity 326 is related to the topic entity 110 in that the person entity 326 follows the topic entity 110, the person entity 326 is an expert in relation to the topic entity 110, and the person entity 326 is frequently used or is trending as a resource in relation to the topic entity 110. As another example, the topic 404 is related to the topic entity 110 as a potential disambiguation topic. For example, if the topic 404 is the acronym ACL for anterior cruciate ligament, it may be related in a disambiguation sense to the topic 110 if it is the acronym ACL for access control list.

Figure 5:
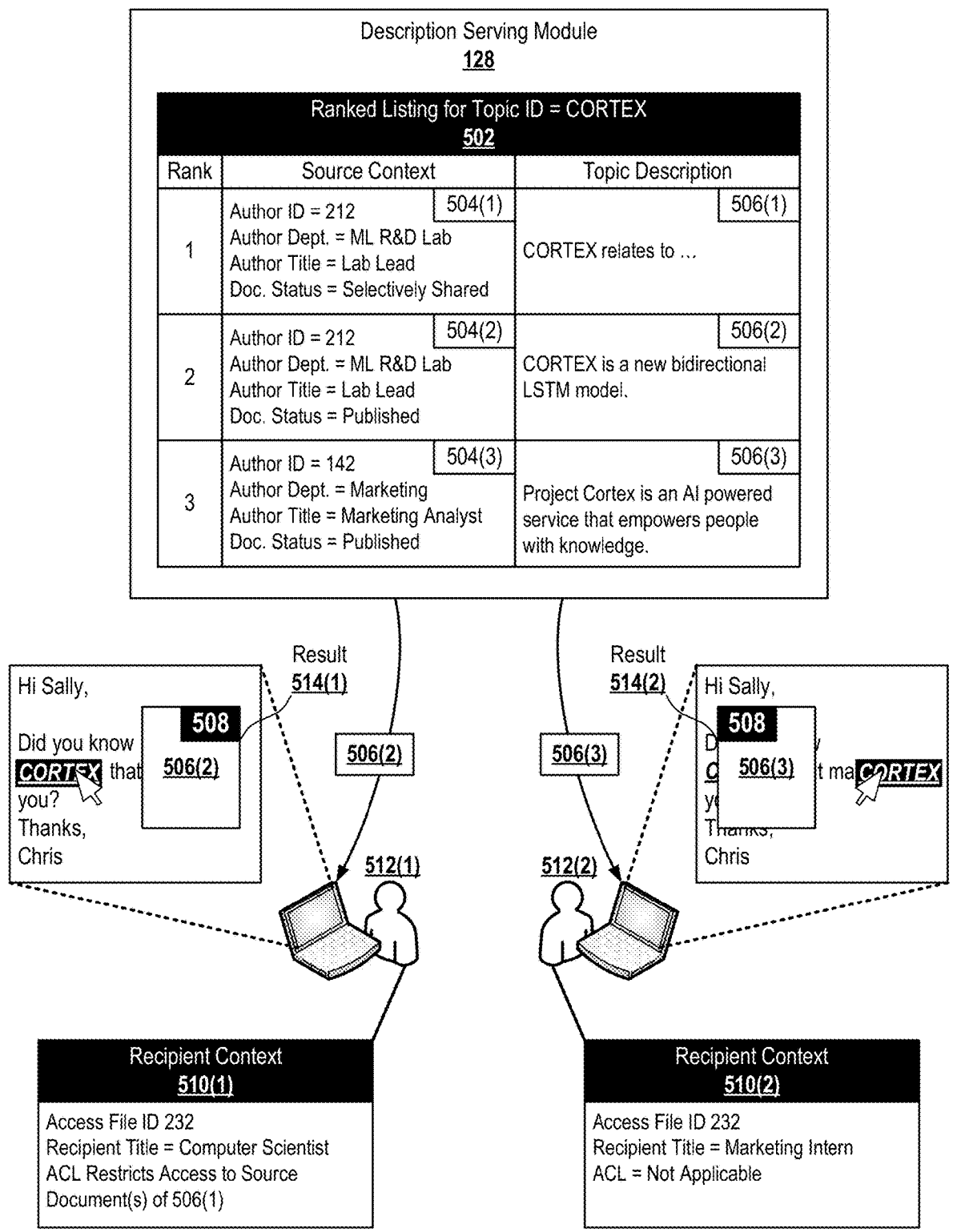
FIG. 5 illustrates an exemplary scenario in which the description serving module selects from a ranked listing of topic descriptions for a particular topic by matching recipient contexts to source contexts.

Turning now to FIG. 5, illustrated is an exemplary scenario in which the description serving module 128 selects from a ranked listing 502 of topic descriptions 506 for a particular topic by matching recipient contexts 510 to source contexts 504. As illustrated, a ranked listing 502 for a topic ID of "CORTEX" includes a first, second, and third topic description 506 each of which comprise a corresponding source context 504.

In the illustrated example, the source contexts 504 corresponding to the individual topic descriptions 506 each include an author ID that corresponds to a unique identifier of the person and/or persons who authored the source document(s) from which the corresponding topic description 506 was extracted. The source contexts 504 further include an indication of an enterprise department to which the author(s) of the corresponding topic descriptions 506 belong. The source contexts 504 further include a title (e.g., description of a position within an enterprise) of the author(s) of the corresponding topic descriptions 506. Additionally, the source contexts 504 indicate a document status associated with the source document(s) from which the corresponding topic description 506 was extracted.

In the illustrated example, each of a first recipient 514(1) and a second recipient 514(2) access the same document from one or more enterprise computing resources. However, based on the correlation levels between the corresponding source contexts 504 and recipient contexts 510, the first recipient 514(1) and the second recipient 514(2) are presented with different topic descriptions 506 of the same topic (i.e., CORTEX in the illustrated example).

With respect to the first recipient 512(1), the first recipient context 510(1) corresponds to accessing a specific file (i.e., file ID 232) by a user having the title of "Computer Scientist." The description serving module 128 may determine this particular aspect of the first recipient context 510(1) based on the directory data 118 (shown in FIG. 1). Based on this particular aspect of the first recipient context 510(1), the description serving module 128 may select one or more topic descriptions 506 from the ranked listing 502 having the highest correlation levels to the corresponding source contexts 504. Here, the description serving module 128 may determine that the first source context 504(1) and second source context 504(2) match the first recipient context 510(1) to a greater degree than the third source context 504(3). For example, topic descriptions 506 that are authored by a user having the title of "Lab Lead" within a department of "Machine Learning Research & Development Lab" may be determined to be more contextually relevant to a recipient having the title of "Computer Scientist" as compared to the third topic description 506(3) that is authored by a user having the title of "Marketing Analyst" within a "Marketing" department. Accordingly, the description serving module 128 may prioritize exposure of the first and second topic descriptions to the first recipient over exposure of the third topic description.

Here, the first recipient context 510(1) further corresponds to an access control list (ACL) 120 restricting the first recipient 512(1) from accessing the source document(s) from which the first topic description 506(1) was extracted. For example, the document status of the source document(s) of the first topic description 506(1) is "Selectively Shared" and the first recipient 510(1) is not included within the listing of persons the source document(s) have been shared with. However, the document status of the source document(s) of the second topic description 506(2) is "Published" and, therefore, the first recipient 510(1) does have access permissions to the source document(s) of the second topic description 506(2). Accordingly, the description serving module 128 selects the second topic description 506(2) for exposure to the first recipient 510(1). Thus, a first result 514(1) of the illustrated scenario is that the second topic description 506(2) is exposed to the first recipient 510(1) in association with the viewed document (i.e., file ID 232).

With respect to the second recipient 512(2), the second recipient context 510(2) corresponds to accessing the same specific file that is accessed by the first recipient 512(1) (i.e., file ID 232). However, the second recipient 512(2) is a user having the title of "Marketing Intern." Thus, based on this particular aspect of the second recipient context 510(2), the description serving module 128 may determine that the third source context 504(3) matches the second recipient context 510(2) to a greater degree than each of the first source context 510(1) and the second source context 504(2). For example, topic descriptions 506 that are authored by a user having the title of "Marketing Analyst" within a department of "Marketing" may be determined to be more contextually relevant to a recipient having the title of "Marketing Intern" as compared to other topic descriptions that are authored by a user having the title of "Lab Lead" within a "ML R&D Lab." Accordingly, the description serving module 128 may prioritize exposure of the third topic description 506(3) to the second recipient over exposure of the first and second topic descriptions. Thus, a second result 514(2) of the illustrated scenario is that the third topic description 506(3) is exposed to the second recipient 510(2) in association with the viewed document (i.e., file ID 232).

Figure 6:
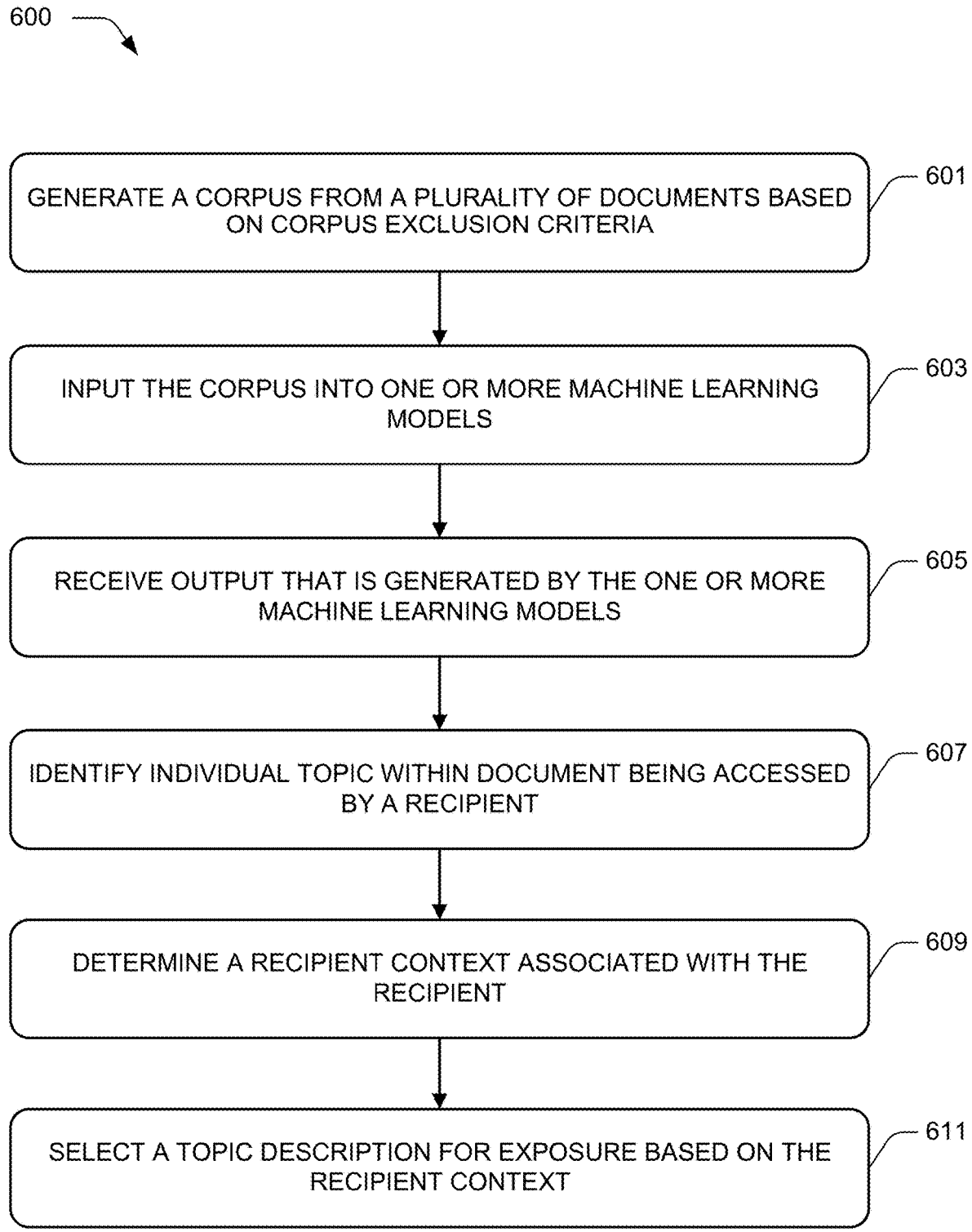
FIG. 6 illustrates a flow diagram of an exemplary process to select a particular topic description to expose to a recipient from a listing of a plurality of different topic descriptions.

FIG. 6 is a flow diagram of illustrative processes 600 which is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, illustrated is a flow diagram of an exemplary process 600 to select a particular topic description to expose to a recipient from a listing of a plurality of different topic descriptions. The topic description may be selected based on one or more source contexts associated with one or more source documents from which the particular topic description has been extracted. Additionally, or alternatively, the topic description may be selected based on a recipient context associated with a recipient who accesses a document that references a topic to which the particular topic description is applicable.

At block 601, a system generates a corpus from a plurality of documents based on corpus exclusion criteria. For example, the system may analyze contents of the plurality of documents and/or metadata associated with the plurality of documents to identify a subset of the plurality of documents to include and/or exclude from the corpus. In some implementations, metadata flagging individual documents as being proprietary, sensitive, or confidential may result in these individual documents being excluded from the corpus.

At block 603, the system inputs the corpus into one or more machine learning models. The one or more machine learning models may be configured to extract a plurality of topic descriptions from the corpus. For example, a topic description related to a particular topic may be extracted and then the particular topic may be parsed from the extracted topic description based on a rule-based term extractor. Additionally, or alternatively, one or more machine learning models may be configured to generate a ranked listing of the plurality of topic descriptions based on one or more source contexts that are associated with individual topic descriptions of the plurality of topic descriptions. For example, the topic descriptions may be ranked based on authoritative statuses of a person(s) who authored one or more topic descriptions, dissemination levels of individual topic descriptions across user accounts and/or the enterprise computing resources, attributes of source documents from which the topic descriptions are extracted, and so on. Regarding dissemination levels of individual topic descriptions, the individual topic description may be placed/ranked within the ranked listing based on a degree to which the individual topic description has been distributed to individual user accounts within an enterprise. For example, a topic description that is extracted from a widely published document may be ranked higher than another topic description that is extracted from a different document that is shared with only a few people or resides exclusively within an individual user's private data.

At block 605, the system receives an output that is generated by the one or more machine learning models. The output may include a plurality of extracted topic descriptions and corresponding topic terms that are parsed from the topic descriptions by a rule-based term extractor. Additionally, or alternatively, the output may include a ranked listing of the plurality of extracted topic descriptions. Generally described, the ranked listing may indicate a relative priority for exposing individual topic descriptions over other topic descriptions. Additionally, or alternatively, the output may indications of underlying source contexts of documents from which the plurality of extracted topic descriptions have been extracted.

At block 607, the system may identify a term-usage instance of a topic within a document being accessed by a recipient. For example, the system may identify the name of a project within the document or the name of a person within the document.

At block 609, the system may determine a recipient context associated with the recipient that is accessing the document. For example, the system may determine a department and/or job title associated with the recipient.

At block 611, the system selects a topic description for exposure to the recipient by way of the document that is being accessed. For example, the system may select one or more topic descriptions from the ranked listing that have highest correlation levels between the recipient context and the corresponding source contexts of the selected topic descriptions.

Figure 7:
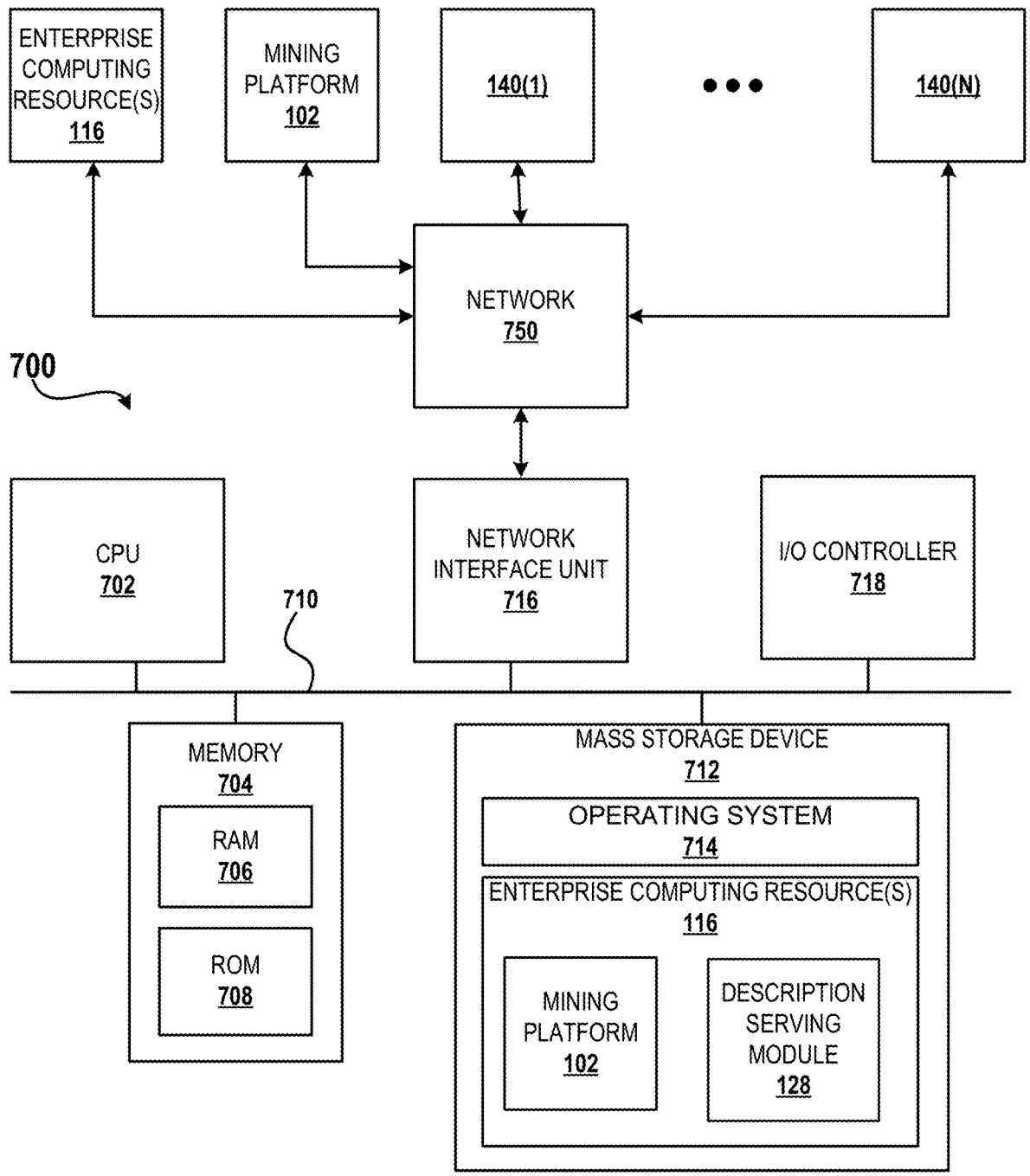
FIG. 7 shows additional details of an example computer architecture for a computer capable of executing the techniques described herein.

FIG. 7 shows additional details of an example computer architecture 700 for a computer capable of executing the techniques described herein. The computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between input controls within the computer architecture 700, such as during startup, is stored in the ROM 708. The computer architecture 700 further includes a mass storage device 712 for storing an operating system 714, other data, and one or more application programs. The mass storage device 712 may further include one or more of the security filter 104, the detonation chamber 112, the false tenant model 130, the real tenants 132), and/or the false tenants 136.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the enterprise computing resources 116 to communicate with one or more of the mining platform 102, and/or one or more computing devices 140.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit input controls, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware input controls constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit input controls constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Example Clauses

The disclosure presented herein may be considered in view of the following clauses.

Example Clause 1. A computer-implemented method, the method comprising: receiving a corpus that is extracted from at least one enterprise computing resource that is configured to store a plurality of documents in association with one or more user accounts; inputting the corpus into a machine learning (ML) model that is configured to: extract, from the corpus, a plurality of topic descriptions for a plurality of topics, and generate a ranked listing, of the plurality of topic descriptions, based on one or more source contexts that are associated with individual topic descriptions of the plurality of topic descriptions; receiving, from the ML model, an output that includes the plurality of topic descriptions and the ranked listing; identifying an individual topic within an individual document that is accessed from an individual user account of the one or more user accounts; determining a recipient context of the individual topic in association with the individual user account; and selecting, from the ranked listing and based on the recipient context, an individual topic description for exposure to the individual user account in association with the individual document.

Example Clause 2. The computer-implemented method of Example Clause 1, further comprising causing a link to the individual topic description to be generated in association with a term-usage instance of the individual topic within the individual document that is being accessed from the individual user account.

Example Clause 3. The computer-implemented method of Example Clause 1, wherein the one or more source contexts include an authoritative status of an author, of the individual topic description, in association with the individual topic.

Example Clause 4. The computer-implemented method of Example Clause 1, wherein the one or more source contexts include a dissemination level, of the individual topic description in association with the individual topic, across the one or more user accounts.

Example Clause 5. The computer-implemented method of Example Clause 1, wherein the determining the recipient context is based on a directory attribute, of the individual user account, that is indicative of a relationship of the individual user account with respect to the individual topic.

Example Clause 6. The computer-implemented method of Example Clause 1, wherein the determining the recipient context is based on an indication, within an access control list, of whether the individual user account is restricted access to one or more source documents from which the individual topic description is extracted.

Example Clause 7. The computer-implemented method of Example Clause 1, wherein the receiving the corpus includes: receiving metadata corresponding to the plurality of documents that are stored in association with the one or more user accounts; receiving corpus exclusion criteria for excluding a subset of the plurality of documents from the corpus; and identifying the corpus based on the metadata and the corpus exclusion criteria.

Example Clause 8. The computer-implemented method of Example Clause 1, wherein the corpus is a user-specific corpus that uniquely corresponds to the individual user account.

Example Clause 9. The computer-implemented method of Example Clause 1, wherein the corpus is a tenant-wide corpus that corresponds to multiple user accounts that each have access to the at least one enterprise computing resource.

Example Clause 10. A system, comprising: at least one processor; and at least one memory in communication with the at least one processor, the at least one memory having computer-readable instructions stored thereupon that, when executed by the at least one processor, cause the at least one processor to: generate a corpus that includes a plurality of documents that are stored in association with at least one enterprise computing resource associated with one or more user accounts; receive an output that is generated by a machine learning (ML) model based on the corpus, wherein the output includes a ranked listing of a plurality of topic descriptions; identify an individual topic within an individual document that is accessed from an individual user account of the one or more user accounts; determine a recipient context of the individual topic in association with the individual user account; and select, from the ranked listing and based on the recipient context, an individual topic description for exposure to the individual user account in association with the individual document.

Example Clause 11. The system of Example Clause 10, wherein: the output further indicates one or more source contexts that are associated with individual topic descriptions of the plurality of topic descriptions, and the individual topic description is further selected based on a correspondence level between the recipient context and an individual source context that is associated with the individual topic description.

Example Clause 12. The system of Example Clause 10, wherein the recipient context is determined based on a disambiguation of the individual topic that is determined from a term-usage instance of the individual topic within the individual document.

Example Clause 13. The system of Example Clause 10, wherein the recipient context is determined based on a directory attribute, of the individual user account, that is indicative of a relationship of the individual user account with respect to an author of the individual topic description.

Example Clause 14. The system of Example Clause 10, wherein the corpus is a user-specific corpus that uniquely corresponds to the individual user account.

Example Clause 15. The system of Example Clause 10, wherein generating the corpus is based on: metadata corresponding to the plurality of documents that are stored in association with the one or more user accounts, and corpus exclusion criteria for excluding a subset of the plurality of documents from the corpus.

Example Clause 16. A system, comprising: at least one processor; and at least one memory in communication with the at least one processor, the at least one memory having computer-readable instructions stored thereupon that, when executed by the at least one processor, cause the at least one processor to: generate a corpus that includes a plurality of documents that are stored in association with at least one enterprise computing resource associated with one or more user account; receive an output that is generated by a machine learning (ML) model based on the corpus, wherein the output includes: a ranked listing of a plurality of topic descriptions, and one or more source contexts that are associated with individual topic descriptions of the plurality of topic descriptions; identify an individual topic within an individual document that is accessed from an individual user account of the one or more user accounts; and select, from the ranked listing and based on the one or more source contexts, an individual topic description for exposure to the individual user account in association with the individual document.

Example Clause 17. The system of Example Clause 16, wherein the one or more source contexts include an authoritative status of an author, of the individual topic description, in association with the individual topic.

Example Clause 18. The system of Example Clause 16, wherein the one or more source contexts include a dissemination level, of the individual topic description in association with the individual topic, across the one or more user accounts.

Example Clause 19. The system of Example Clause 16, wherein the corpus is a tenant-wide corpus that corresponds to multiple user accounts that each have access to the at least one enterprise computing resource.

Example Clause 20. The system of Example Clause 16, wherein the corpus is a user-specific corpus that uniquely corresponds to the individual user account.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, the method comprising:
    receiving a corpus that is extracted from at least one enterprise computing resource that is configured to store a plurality of documents in association with one or more user accounts;
    inputting the corpus into a machine learning (ML) model that is configured to:
        extract, from the corpus, a plurality of topic descriptions for a plurality of topics, and
        generate a ranked listing, of the plurality of topic descriptions, based on one or more source contexts that are associated with individual topic descriptions of the plurality of topic descriptions;
    receiving, from the ML model, an output that includes the plurality of topic descriptions and the ranked listing;
    identifying an individual topic within an individual document that is accessed from an individual user account of the one or more user accounts;
    determining a recipient context of the individual topic in association with the individual user account; and
    selecting, from the ranked listing and based on the recipient context, an individual topic description for exposure to the individual user account in association with the individual document.

2. The computer-implemented method of claim 1, further comprising causing a link to the individual topic description to be generated in association with a term-usage instance of the individual topic within the individual document that is being accessed from the individual user account.

3. The computer-implemented method of claim 1, wherein the one or more source contexts include an authoritative status of an author, of the individual topic description, in association with the individual topic.

4. The computer-implemented method of claim 1, wherein the one or more source contexts include a dissemination level, of the individual topic description in association with the individual topic, across the one or more user accounts.

5. The computer-implemented method of claim 1, wherein the determining the recipient context is based on a directory attribute, of the individual user account, that is indicative of a relationship of the individual user account with respect to the individual topic.

6. The computer-implemented method of claim 1, wherein the determining the recipient context is based on an indication, within an access control list, of whether the individual user account is restricted access to one or more source documents from which the individual topic description is extracted.

7. The computer-implemented method of claim 1, wherein the receiving the corpus includes:
    receiving metadata corresponding to the plurality of documents that are stored in association with the one or more user accounts;
    receiving corpus exclusion criteria for excluding a subset of the plurality of documents from the corpus; and
    identifying the corpus based on the metadata and the corpus exclusion criteria.

8. The computer-implemented method of claim 1, wherein the corpus is a user-specific corpus that uniquely corresponds to the individual user account.

9. The computer-implemented method of claim 1, wherein the corpus is a tenant-wide corpus that corresponds to multiple user accounts that each have access to the at least one enterprise computing resource.

10. A system, comprising:
    at least one processor; and
    at least one memory in communication with the at least one processor, the at least one memory having computer-readable instructions stored thereupon that, when executed by the at least one processor, cause the at least one processor to:
        generate a corpus that includes a plurality of documents that are stored in association with at least one enterprise computing resource associated with one or more user accounts;
        receive an output that is generated by a machine learning (ML) model based on the corpus, wherein the output includes a ranked listing of a plurality of topic descriptions;
        identify an individual topic within an individual document that is accessed from an individual user account of the one or more user accounts;
        determine a recipient context of the individual topic in association with the individual user account; and
        select, from the ranked listing and based on the recipient context, an individual topic description for exposure to the individual user account in association with the individual document.

11. The system of claim 10, wherein:
the output further indicates one or more source contexts that are associated with individual topic descriptions of the plurality of topic descriptions, and
the individual topic description is further selected based on a correspondence level between the recipient context and an individual source context that is associated with the individual topic description.

12. The system of claim 10, wherein the recipient context is determined based on a disambiguation of the individual topic that is determined from a term-usage instance of the individual topic within the individual document.

13. The system of claim 10, wherein the recipient context is determined based on a directory attribute, of the individual user account, that is indicative of a relationship of the individual user account with respect to an author of the individual topic description.

14. The system of claim 10, wherein the corpus is a user-specific corpus that uniquely corresponds to the individual user account.

15. The system of claim 10, wherein generating the corpus is based on:
metadata corresponding to the plurality of documents that are stored in association with the one or more user accounts, and
corpus exclusion criteria for excluding a subset of the plurality of documents from the corpus.

16. A system, comprising:
at least one processor; and
at least one memory in communication with the at least one processor, the at least one memory having computer-readable instructions stored thereupon that, when executed by the at least one processor, cause the at least one processor to:
generate a corpus that includes a plurality of documents that are stored in association with at least one enterprise computing resource associated with one or more user account;
receive an output that is generated by a machine learning (ML) model based on the corpus, wherein the output includes:
a ranked listing of a plurality of topic descriptions, and
one or more source contexts that are associated with individual topic descriptions of the plurality of topic descriptions;
identify an individual topic within an individual document that is accessed from an individual user account of the one or more user accounts; and
select, from the ranked listing and based on the one or more source contexts, an individual topic description for exposure to the individual user account in association with the individual document.

17. The system of claim 16, wherein the one or more source contexts include an authoritative status of an author, of the individual topic description, in association with the individual topic.

18. The system of claim 16, wherein the one or more source contexts include a dissemination level, of the individual topic description in association with the individual topic, across the one or more user accounts.

19. The system of claim 16, wherein the corpus is a tenant-wide corpus that corresponds to multiple user accounts that each have access to the at least one enterprise computing resource.

20. The system of claim 16, wherein the corpus is a user-specific corpus that uniquely corresponds to the individual user account.

* * * * *